United States Patent [19]
Boucherie

[11] Patent Number: 5,728,408
[45] Date of Patent: Mar. 17, 1998

[54] MOLDING APPARATUS WITH A TUFT FEEDER FOR MAKING A BRUSH

[75] Inventor: Bart Gerard Boucherie, Izegem, Belgium

[73] Assignee: G.B. Boucherie N.V., Izegem, Belgium

[21] Appl. No.: 411,932

[22] Filed: Mar. 28, 1995

[30] Foreign Application Priority Data

Mar. 29, 1994 [GB] United Kingdom ............... 9406226

[51] Int. Cl.⁶ .................................................. B29C 45/14
[52] U.S. Cl. ...................... 425/116; 264/40.1; 264/243; 264/261; 300/7; 300/8; 300/17; 425/123; 425/125; 425/126.1; 425/129.1; 425/169; 425/805
[58] Field of Search .............................. 425/116, 123, 425/125, 126.1, 124.1, 169, 805; 264/40.1, 243, 261, 265; 300/7, 8, 11, 17, 21

[56] References Cited

U.S. PATENT DOCUMENTS

| 3,408,112 | 10/1968 | Piotrowski | 300/21 |
|---|---|---|---|
| 3,642,401 | 2/1972 | Wilson | 425/173 |
| 3,799,616 | 3/1974 | Lewis, Jr. | 300/7 |
| 3,910,637 | 10/1975 | Lewis, Jr. | 300/7 |
| 4,255,224 | 3/1981 | Lorenz | 300/21 |
| 4,310,377 | 1/1982 | Lorenz | 300/21 |
| 4,609,228 | 9/1986 | Bickel | 425/805 |
| 4,696,519 | 9/1987 | Lewis, Jr. | 300/7 |
| 4,749,233 | 6/1988 | Weihrauch | 300/21 |
| 5,143,424 | 9/1992 | Boucherie | 264/243 |
| 5,165,759 | 11/1992 | Lewis, Jr. | 300/21 |
| 5,344,218 | 9/1994 | Weihrauch | 300/7 |
| 5,390,984 | 2/1995 | Boucherie et al. | 300/21 |
| 5,533,791 | 7/1996 | Boucherie | 264/243 |

FOREIGN PATENT DOCUMENTS

| 0463217 | 1/1992 | European Pat. Off. . |
|---|---|---|
| 0567672 | 11/1993 | European Pat. Off. . |
| 1604673 | 10/1972 | Germany . |
| 2511661 | 10/1975 | Germany . |
| 4027288 | 3/1992 | Germany . |
| 4040297 | 6/1992 | Germany . |

Primary Examiner—Jay H. Woo
Assistant Examiner—Joseph Leyson
Attorney, Agent, or Firm—Sixbey Friedman Leedom & Ferguson; Gerald J. Ferguson, Jr.; Thomas W. Cole

[57] ABSTRACT

A brush making machine with a mold for injection molding of brush bodies is disclosed. The mold includes a stationary mold part, a movable mold part and a pair of complementary mold parts fitting into a recess of the movable mold part. The complementary mold parts have tuft insertion holes. While one of the complementary mold parts fills the recess of the movable mold part and a brush body is injection molded with tufts of bristles embedded in the molding material, the other complementary mold part is in front of a tuft feeder for introducing tufts of bristles into the tuft insertion holes. The tuft feeder includes a plurality of tuft picking and transfer tubes which are movable to pick out tufts of bristles from a bristle container and to transfer each of these tufts to a position adjacent one of the tuft insertion holes. Plunger members penetrate into respective tubes to push out the tufts of bristles contained therein and to force them into and through the tuft insertion holes.

16 Claims, 8 Drawing Sheets

MOLDING APPARATUS WITH A TUFT FEEDER FOR MAKING A BRUSH

BACKGROUND OF THE INVENTION

1. Field of the Invention

The present invention relates to a brush making machine which comprises a mold for injection molding brush bodies having tufts of bristles embedded in the molding material.

2. Description of the Prior Art

In a brush making machine for tooth brushes which is disclosed in EP 0 463 217 A1, the tooth brush bodies are molded in a mold composed of three mold parts wherein one of the mold parts is stationary, a second mold part is movable towards and away from the first mold part to close and open the mold cavity and the third mold part fits into a recess of the first or of the second mold part to complete the cavity defining surface of the second mold part in the region of the brush head. A pair of third mold parts are mounted on the ends of a two-armed carrier which performs a combined pivotal and reciprocating movement to bring one of the mold parts to a position fitting into the recess of the second mold part while the mold part on the end of the other arm of the carrier is in front of a tuft feeder, and vice versa. The tuft feeder feeds a plurality of strands of fibres into a number of tuft insertion holes provided in the mold part in a pattern corresponding to the desired tuft pattern of the brush to be produced. The strands of fibre are advanced to the tuft insertion holes, so that their ends project into the mold cavity partially defined by the mold part. The ends of the fibres are then exposed to heat to form individual knobs at the inner end of each tuft of fibres, so that the tufts will be firmly anchored in the molding material flowing around the knob portions. The strands of fibres are then severed, and the mold part with the tufts of fibres, or bristles, therein is moved to the mold wherefrom a finished tooth brush is simultaneously ejected. Thus, while a tooth brush is being molded, the production of the next tooth brush is prepared by inserting tufts of bristles into one of the two mold parts having tuft insertion holes.

After the molding of the brush has been completed, further finishing operations are required to round and polish the ends of the bristles, and eventually, to provide the bristles with a desired contour or shape.

The use of tuft picking and transfer tubes in the production of tooth brushes has already been devised in EP 0 567 672 A1, for example. In the method disclosed therein, however, a base member with a pattern of tuft insertion holes is required which becomes part of the finished brush body. It is not possible to produce the brush body in a single molding step.

Picking out individual tufts of bristles from a package wherein the bristles are held in a parallel compressed state is a delicate operation. When the tubes are advanced with their front ends against the pre-finished ends of bristles in the package, some of the bristles may easily penetrate into the channel defined by a respective tube, but others will abut the edge of the tube and buckle, preventing further penetration of the tube into the package. Different methods have been proposed to assist the penetration of picking tubes into a package of bristles. In EP 0 567 672 A1 picking tubes with a beveled front end are shown. In DE 40 27 288 A1 tuft picking tubes are shown which have a narrow neck portion on their front end and a wider internal channel. In U.S. Pat. No. 5,165,759 the penetration of the picking tubes is assisted by a vibrating or oscillating plate which engages the rear ends of the bristle fibres to move them in directions parallel to their length. These methods may be more or less successful, but they are of insufficient reliability for use with a mold, the tuft insertion holes of which must be filled with tufts of bristles to prevent leakage of molding material out of the mold cavity.

SUMMARY OF THE INVENTION

An object of the invention is to provide a brush making machine which allows brushes to be produced with a variety of tuft compositions and configurations, including different types of fibres and contoured shapes of the bristles, without requiring additional finishing operations.

According to the invention, a brush making machine is provided which comprises a mold for injection molding brush bodies, in particular of tooth brush bodies, having tufts of bristles embedded in the molding material. The mold comprises at least two relatively movable mold parts defining a mold cavity. One of the mold parts has a cavity defining surface portion with tuft insertion holes therein arranged in a pattern corresponding to the desired tuft pattern of the brush to be produced. A tuft feeder is provided for introducing tufts of bristles into the tuft insertion holes, so that the bristles have one end projecting into the mold cavity. The tuft feeder comprises a bristle container loaded with pre-finished bristles, i.e. fibres with one rounded and polished end, in a parallel packed relationship and a plurality of tuft picking and transfer tubes arranged in a pattern corresponding to at least part of the pattern of tuft insertion holes. The tuft picking and transfer tubes are movable to pick out tufts of bristles from the bristle container and to transfer each of these tufts to a position adjacent one of the tuft insertion holes. Each of the tuft picking and transfer tubes is associated with a plunger member for penetrating into a respective tube to push out a tuft of bristles contained therein for introduction into an adjacent tuft insertion hole. By using movable tuft picking and transfer tubes with associated plunger members, the tuft insertion holes of the mold can be filled with different types of bristle fibres taken from different stocks of pre-fininshed fibres. The tufts can be inserted to different levels over the base of the finished brush body to provide bristles with a contoured shape.

According to one specific embodiment of the invention, the tuft picking and transfer tubes are held in a carrier permitting independent axial shifting of the tubes upon penetration into the bristle container. The carrier is provided with releasable clamping means for clamping the tubes in fixed positions during transfer of tufts into the molds. Thus, in the initial phase of penetration of the tubes into the package of bristle fibres, each tube is free to advance into the package independent of all other tubes, and the tubes are not simultaneously forced into the package. Some of the tubes may have penetrated an initial distance into the package, while others have been rejected by abutment of their front edge against the ends of the bristle fibres. A further improvement is achieved by driving the tubes into the package with a plurality of successive initial strokes, whereby each tube is repeatedly advanced, so that the front end thereof penetrates into the bristle container only a fraction of bristle length until a tuft of bristles is engaged therein, and with a further, or final stroke for advancing the tubes further into the bristle container only when all of the tubes have a tuft of bristles engaged therein. Thereafter, the clamping means is activated and the tubes are fixed in position for transfer of the tufts to the mold.

Penetration of the tubes into the pack of bristle fibres may be further assisted by frictionally engaging the rear ends of the fibres with a plate vibrating in a direction transverse to the length of the bristles. The successive strokes of the tubes are preferably produced by a reciprocating pusher member engaging the rear ends of the tubes. The pusher member may be configured to engage selected ones of the tube at a time, the remaining tubes being thereafter engaged by a different pusher member to drive the tubes into another bristle container with bristles of a different type, for example, differently coloured bristles.

The tuft picking operation is greatly facilitated by using a particular type of bristle container provided by the present invention. The bristle container has a flexible band engaged around a pack of bristles. Preferably, the flexible band forms a generally U-shaped loop into an open side of which a movable pressure member is engaged to maintain the bristles under constant pressure. After each set of tufts has been picked out of the container, the pressure member is pushed further into the container to compensate for the diminishing volume of the package. The flexible band allows the package to slightly move in all directions transverse to the length of the fibres in response to penetration of the picking tubes.

When the package of fibres has been reduced in the container to a predetermined amount, the container needs to be refilled. Refilling of the container can be done continuously or, preferably, in a combined bristle processing and bristle container refilling device provided by the present invention. This device includes a rotary indexing disk with a plurality of spaced bristle accommodation pockets around its periphery. A raw fiber supply station is located at a first position around the disk to supply a bundle of raw fibres to each of the pockets. At least one fibre processing station, for example, a grinding station for roundening one end of the fibres and a polishing station, are provided at different peripherally spaced positions. A finished bristle collecting station takes over the finished bristles from the pockets and feeds them into an open side of the bristle container.

The invention also provides a method of picking individual tufts of brush bristles from a package of bristles in a bristle container wherein the bristles are held in a parallel compressed state. According to the invention, a plurality of tuft picking tubes are initially driven with their front ends into the package of bristles only a small fraction of bristle length while the bristle ends facing away from the tubes are frictionally engaged by a plate vibrating in a direction transverse to the length of the bristles. In the preferred embodiment, the picking tubes are stopped after this initial stroke and the plate goes on vibrating to assist alignment of the forward bristle ends inside the openings on the forward ends of the picking tubes. Some of the bristles will abut the front edge of a picking tube and buckle. Due to continued vibration for a short period of time, 0.5 to 5 seconds, for example, most of these bristles will have aligned inside or outside of the opening in the picking tube. To ensure that all bristles will be properly aligned, the vibrating plate now performs a combined transverse vibrational movement and longitudinal tapping movement whereby the bristles are simultaneously vibrated and pushed forward to be deflected by and away from the edges of the picking tubes. When no more bristles abut the edges of the picking tubes, vibration and tapping movement of the plate is stopped, and the plate is replaced with a reaction plate presenting a smooth alignment surface to the rear ends of the bristles. The picking tubes are now completely driven into the package of bristles with a final stroke, and pulled out of the package to complete the tuft picking operation.

BRIEF DESCRIPTION OF THE DRAWINGS

Further features and advantages of the invention will stand out from the following description with reference to the drawings. In the drawings:

FIG. 1 of the drawings shows the main components of a brush making machine designed for producing tooth brushes. One of these components is a mold composed of a first, stationary mold part 10, a second, movable mold part 12 and a pair of complementary mold parts 14a, 14b fitting into a recess 16 of the first or second mold part 10 or 12. The complementary mold parts 14a, 14b are connected to the ends of a two-armed carrier 18 which is mounted for pivotal and reciprocating movement about and along an axis 20. The mold parts 10, 12 and 14a (or 14b) define a mold cavity 22 having the shape of a tooth brush body to be molded. The complementary mold parts 14a, 14b have a cavity defining surface corresponding to the head portion of a tooth brush and, in particular, to the side of the head portion from which the bristles project after completion of the molding process. The mold parts 14a, 14b are thus provided with a plurality of tuft insertion holes 24 extending through the mold part and opening into the cavity portion 22a defined therein. As can be seen in FIG. 1, either one of the mold parts 14a, 14b is movable into a position fitting into the recess 16 of the mold part 12, the other complementary mold part being then in a position ready for receiving a set of fibre tufts to form the bristles of the tooth brush.

Figure 1:
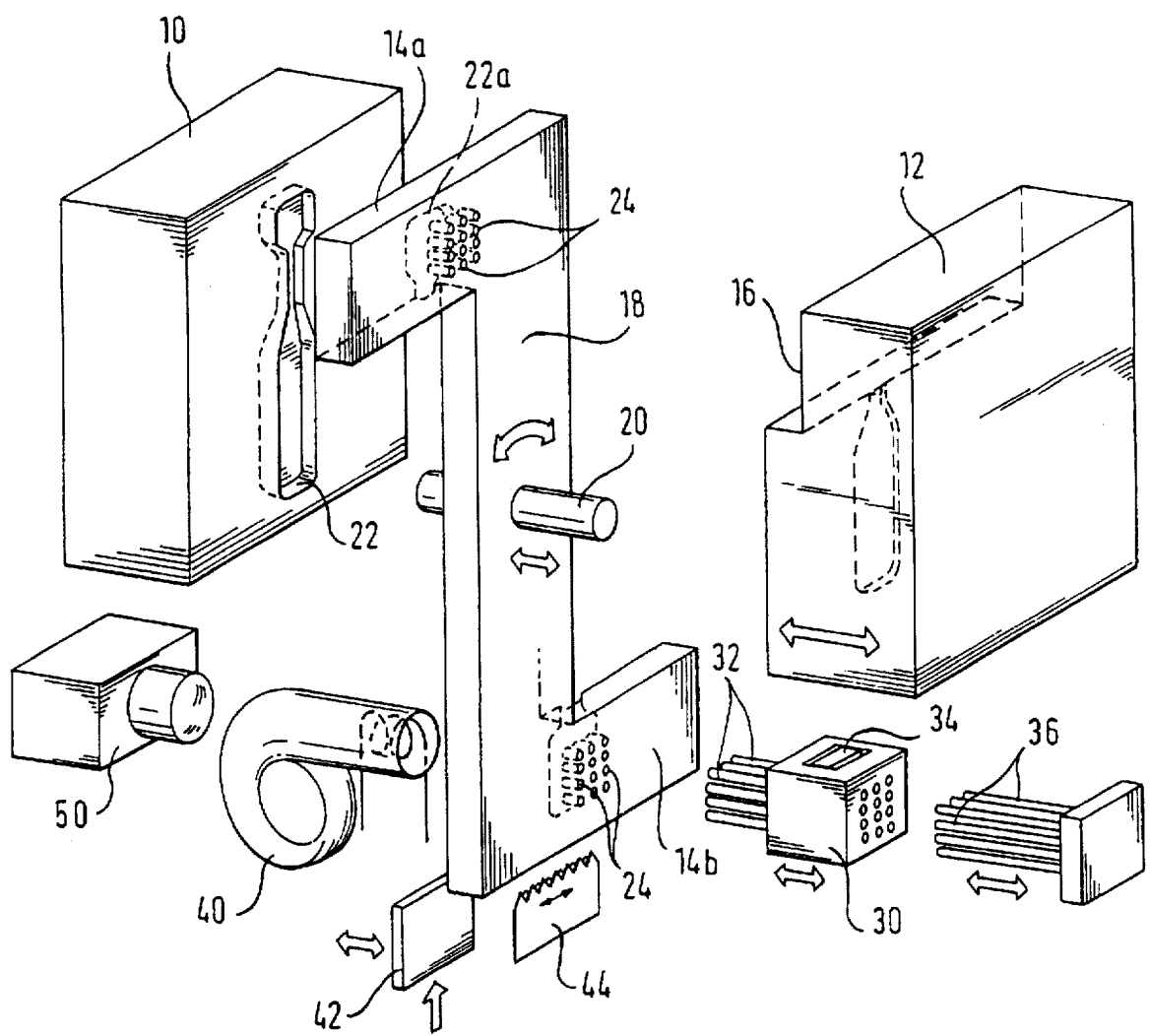
FIG. 1 shows a schematic perspective view of a mold with a tuft feeder.

The required sets of tufts are supplied to the complementary mold parts 14a, 14b by a tuft feeder device which is also schematically shown in FIG. 1. The tuft feeder device comprises a movable carrier cassette 30 which carries a set of tuft picking and transfer tubes 32. The tubes 32 are held in the carrier cassette 30 in a manner to allow relative shifting movements in the axial directions of the tubes, but a clamping mechanism with a clamping plate 34 is provided to clamp the tubes 32 in fixed positions with respect to the carrier cassette 30. The tuft picking and transfer tubes 32 are arranged in the carrier cassette 30 in a pattern corresponding to the pattern of the tuft insertion holes 24 in the mold parts 14a, 14b. A set of plunger members 36 likewise arranged in a pattern corresponding to that of the holes 24 is associated with the tubes 32, so that the plunger members 36 can penetrate into the internal channels formed in the tubes 32, and push forward a tuft of bristles contained therein.

A heating device 40, e.g. a hot air blower, is provided to project a stream of hot air against the ends of tuft fibres inserted through the holes 24 and projecting into the cavity portion 22a. The purpose of heating the fibre ends is to partially melt the material of the fibres to form individual knobs of fibre material or, eventually, a more or less continuous base of fibre material that will be embedded in the molding material in the course of the molding step.

As further seen in FIG. 1, an optional movable plate 42 is provided which is used as a stop for tufts of fibres pushed through the holes 24 by means of the plunger members 36. The plate 42 can be configured to provide a desired contour of the bristle tufts projecting from the finished tooth brush. Any excess length of fibres projecting into the mold cavity can be trimmed off with a cutter 44.

An optical inspection device 50, such as a video camera, is provided to inspect the holes 24 during or after the insertion of fibre tufts into the holes 24. Should any of the tufts be missing, an appropriate corrective action is taken. While an optical inspection device 50 is shown, any other detection system could be used, a tactile detection device, for example.

Figure 2:
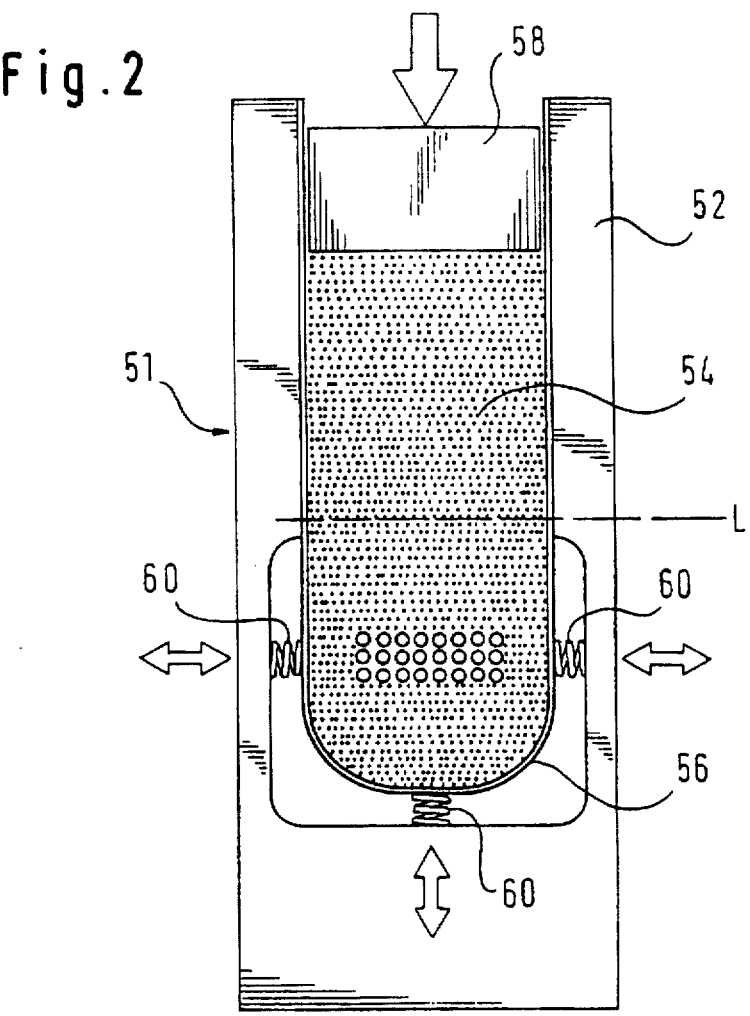
FIG. 2 is a schematic side view of a bristle container.

In the tuft feeder device, a particular bristle container is used. The bristle container is shown in FIG. 2. As seen in FIG. 2, the container 51 comprises a generally U-shaped frame 52, the upright legs of which define a generally rectangular space for accommodation of a package of parallel pre-finished bristles (or fibres) 54. A flexible band 56 is engaged about the package of bristles 54. The upper ends of the flexible band 56 are held on the inner sides of the upright legs of the frame 52. The flexible band 56 is also generally U-shaped, with an open upper end which is closed by a pressure block 58. The pressure block 58 maintains the bristles 54 under a substantially constant pressure. When tufts of bristles are picked out from the package, the pressure block 58 is lowered to compensate for the reduction in volume of the package. The flexible band 56 allows for a limited lateral movement of the package of bristles 54 in the lower portion thereof. The lower part of the flexible band 56 is additionally supported by three resilient supporting members 60, such as pressure springs engaged between the outer surface of the band 56 and a recessed wall portion of the frame 52.

Figure 3A:
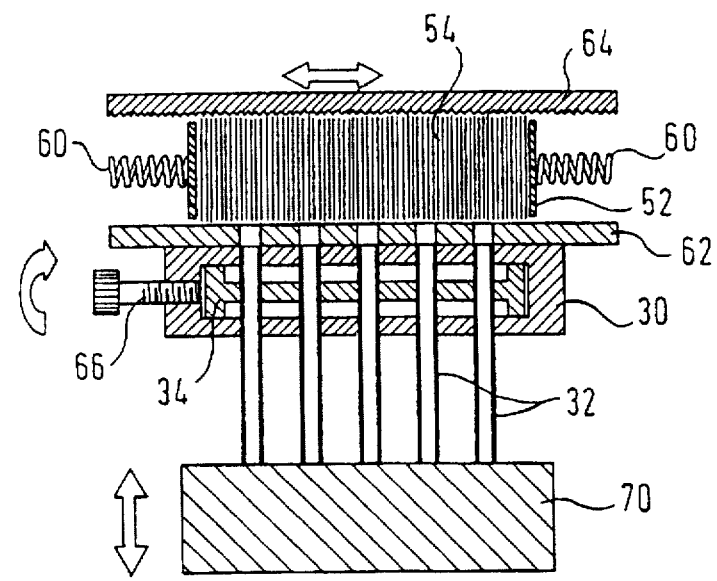
FIGS. 3a, b, c show different phases of picking tube penetration into a bristle container.

FIG. 3a shows the bristle container in an operative position adjacent the carrier cassette 30 with the tuft picking and transfer tubes 32. A plate 62 provided with through openings aligned with the tubes 32 is located between the carrier cassette 30 and the package of bristles 54. On the side opposite the plate 62, the rear ends of the bristles 54 are frictionally engaged by a vibrating plate 64, the vibrating movement of which is parallel to its plane.

The carrier cassette 30 comprises a pair of spaced front and rear walls with aligned openings slidingly accommodating the tubes 32. The clamping plate 34 is located in the space defined within the front and rear walls of the carrier cassette 30. The clamping plate 34 is likewise provided with openings through which the tubes 32 extend. The tubes 32 are normally free to slide in the carrier cassette 30 in the direction of their length. However, when a lateral force acts on the clamping member 34, which can be produced by rotation of a clamping screw 66, the tubes 32 are clamped and fixed in position with respect to the carrier cassette 30.

As further seen in FIG. 3a, a pusher block 70 is provided. The pusher block 70 engages the rear ends of the tubes 32 and performs repeated reciprocating pushing strokes tending to advance the forward ends of the tubes 32 to slightly penetrate into the package of fibres 54. In an initial phase of the tuft picking process, the pusher block 70 repeatedly pushes the forward ends of the tubes 32 over a short distance of some 1 or 2 mm into the package of bristles 54. Some of the tubes 32 will readily engage around a tuft of bristles penetrating into the internal channel of the tube, the surrounding bristles being spread by the forward edge of the tube. When the pusher block 70 retracts from the rear ends of the tubes 32, those tubes that have found a way into the package of bristles 54 will remain engaged in the package, but the remaining tubes will return to their initial position, being rejected by abutment on the front ends of the bristles. As is readily understood, such return movement of the tubes 32 is permitted because the tubes are free to shift in the openings of the carrier cassette 30 independent of each other. To assist penetration of the tubes 32 into the package of bristles 54, the plate 64 performs a vibrating movement, so that the bristles are slightly moved in the package 54 in a direction transverse to their length.

Figure 3B:
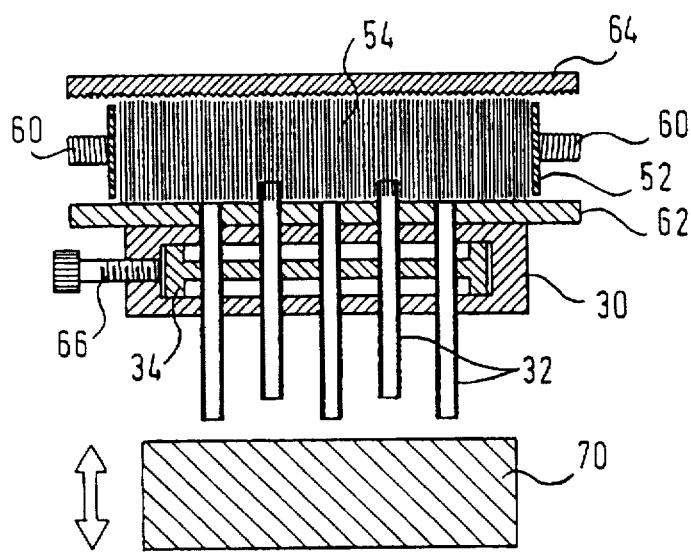
Figure 3C:
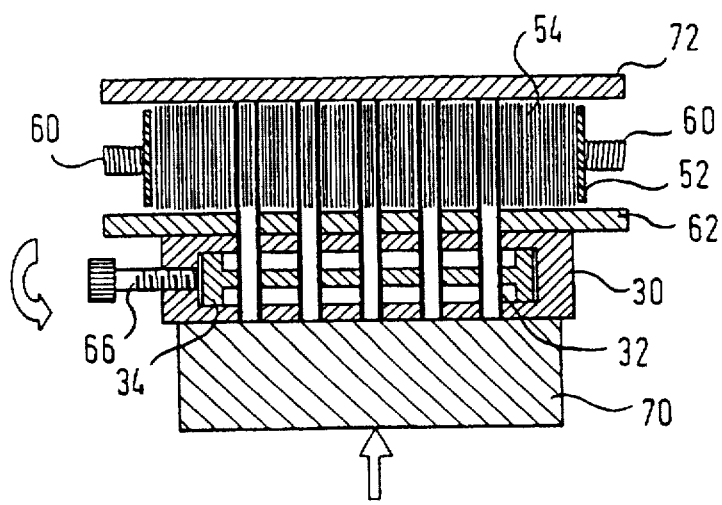

FIG. 3b shows an initial state of the tuft picking process where two of the tubes 32 have already found their way into the package of bristles 54 and three further tubes 32 have been rejected and returned to their initial positions. However, after a limited number of pushing strokes by the pusher block 70, all of the tubes 32 will have penetrated some distance into the package of bristles 54. At that time, the pusher block 70 performs a final further stroke whereby the tubes 32 are fully pushed through the package of bristles 54 until they abut an end plate 72 now replacing the vibrating plate 64 as is shown in FIG. 3c. The clamping screw 66 is rotated to engage the clamping plate 34, so that the tubes 32 are fixed in position with respect to the carrier cassette 30. The pusher block 70 is retracted and the tubes 32 can be withdrawn from the package of bristles 54, with tufts of bristles remaining engaged in the internal channels of the tubes 32.

Figure 4:
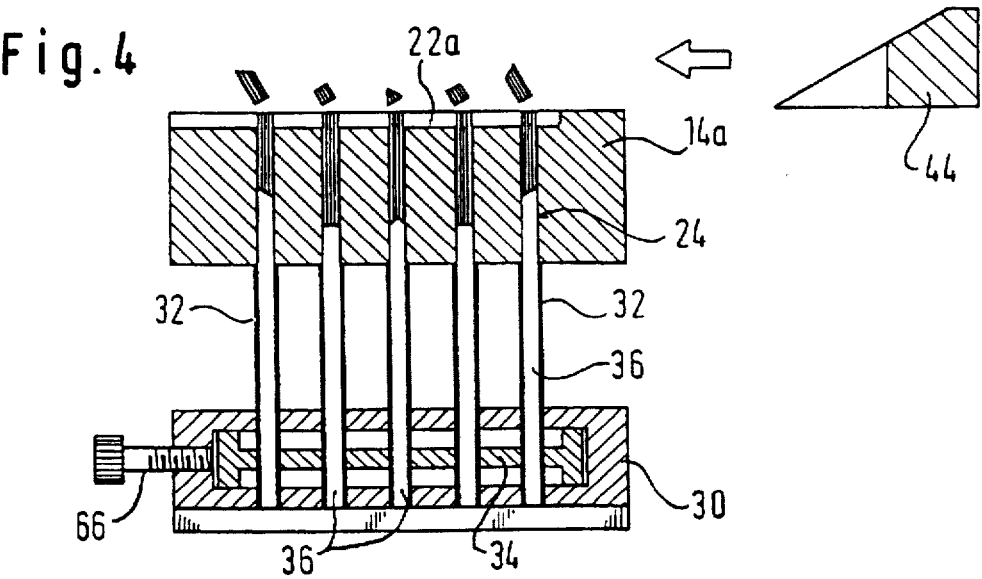
FIG. 4 shows a mold part with tufts of bristles inserted therein.

The carrier cassette 30 with the tubes 32 and the tufts of bristles engaged therein is now moved, so that the forward ends of the tubes 32 are aligned around the tuft insertion holes 24 of the complementary mold part 14a or 14b. As shown in FIG. 4, the plunger members 36 are now introduced into the rear ends of the tubes 32 to push the tufts of bristles contained therein through the holes 24 of the mold part 14a (or 14b). As is further seen in FIG. 4, the plunger members 36 can be advanced different lengths, so that the tufts of bristles have their outer ends at different levels with respect to the cavity defining surface portion of the mold part 14a. Any excessive length of tuft fibres projecting into the cavity can now be trimmed off using the cutter 44. In addition, as also seen in FIG. 4, the forward ends of the plunger members 36 can be shaped to provide the outer ends of the tufts with a desired profile.

Figure 5A:
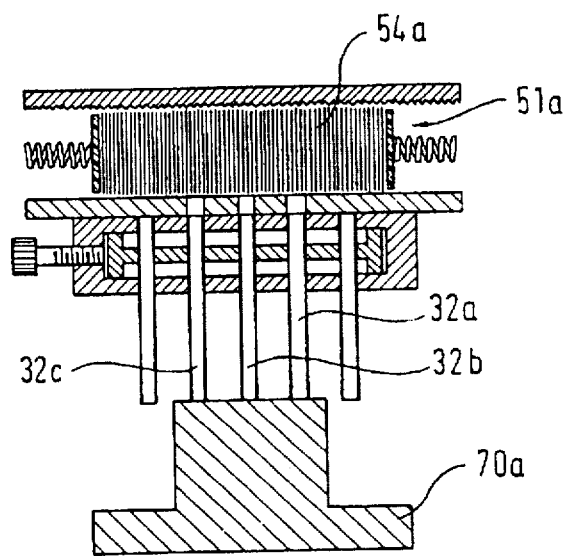
FIGS. 5a and b show alternative embodiments of tuft picking devices.
Figure 5B:
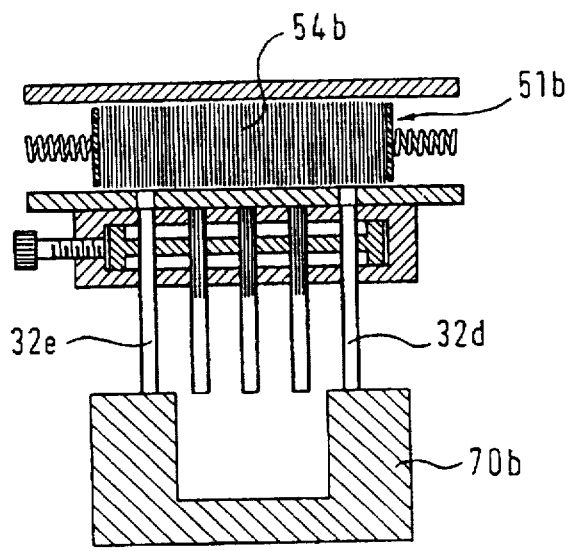

In the alternative embodiment shown in FIGS. 5a and 5b, a pair of different pusher blocks 70a and 70b is used. The pusher block 70a will selectively engage only a first set of tubes, referenced 32a, 32b and 32c in FIG. 5a. The remaining tubes 32d and 32e will be engaged by the pusher block 70b in a subsequent tuft picking operation. In the first tuft picking operation illustrated in FIG. 5a, bristles 54a of a first type are picked out from a first bristle container 51a, and in the second tuft picking operation shown in FIG. 5b, a second type of bristles 54b are picked from a second bristle container 51b. As is readily understood, any number of bristle types can be combined in this manner to produce a wide variety of tooth brushes.

Figure 6:
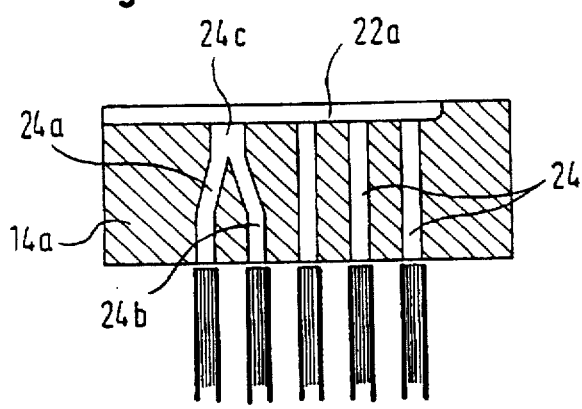
FIG. 6 shows an alternative embodiment of a mold part with tuft insertion holes.
Figure 7:
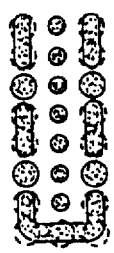
FIG. 7 shows a pattern of tufts that can be produced.
Figure 8:
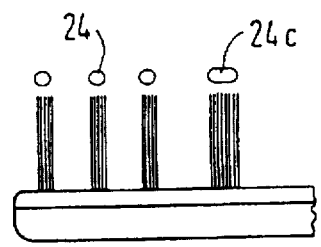
FIG. 8 is a side view of a tooth brush head with tufts of bristles molded in the head portion.

Another manner to combine bristles of like or different type is illustrated in FIGS. 6, 7 and 8. As seen in FIG. 6, mold part 14a (or 14b) has a number of straight tuft insertion holes 24 and a pair of holes 24a, 24b merging in a common outlet 24c on the side of the cavity portion 22a. As illustrated in FIG. 8, the outlet 24c may be of oblong shape in plan view, resulting in a wider tuft of bristles in the finished tooth brush. By merging at least two tuft insertion holes in a common outlet, various types of tuft patterns can be achieved. An example is shown in FIG. 7.

Figure 9:
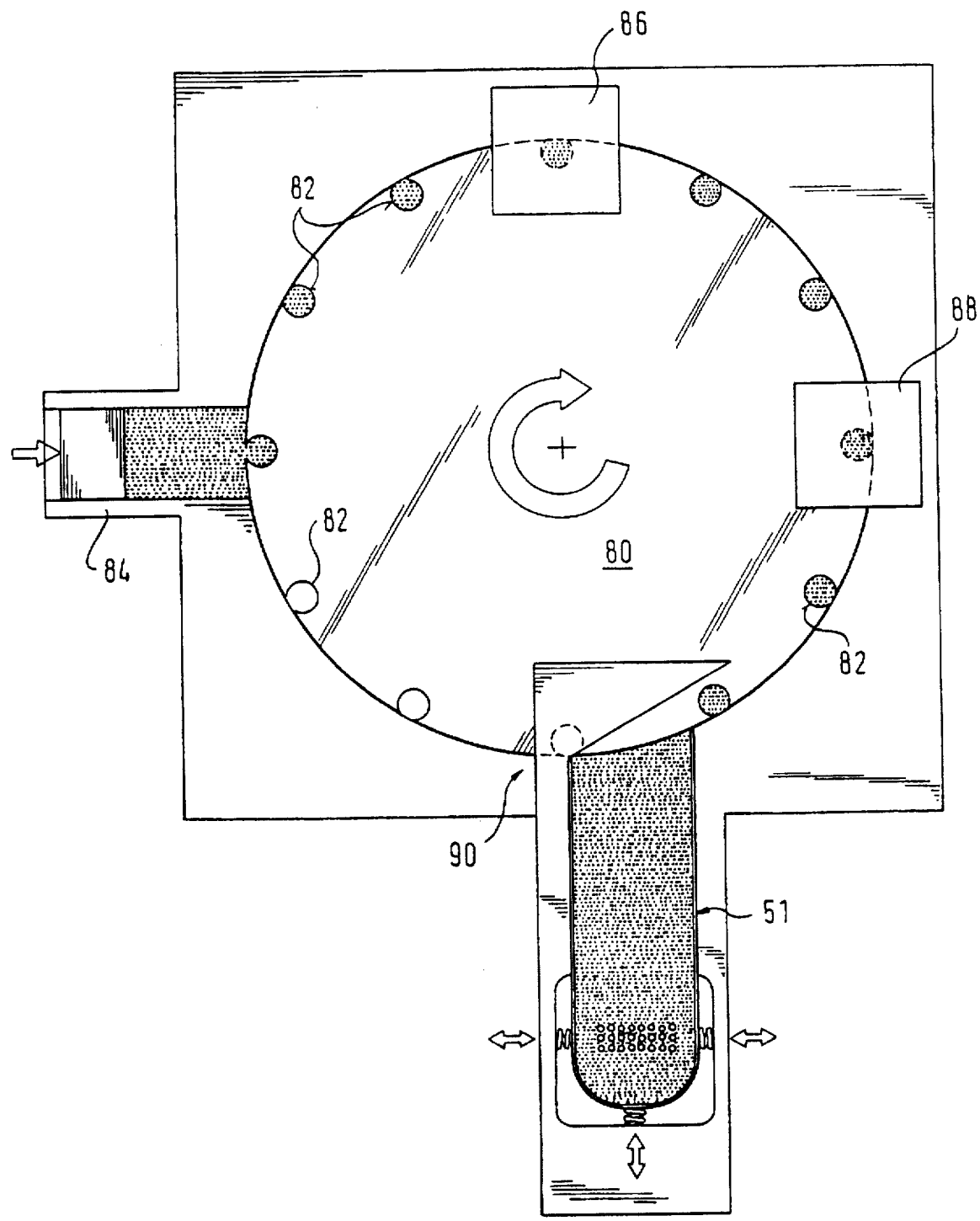
FIG. 9 is a schematic side view of a combined bristle processing and bristle container refilling device.

Referring now again to FIG. 2, and additionally to FIG. 9, when the package of bristles 54 is progressively exhausted and the pressure block 58 lowered to a level such as level L indicated in FIG. 2, the fibre container needs to be refilled. At that time, a large number of tooth brushes may have been produced from a single bristle container. The bristle container is then removed from the tuft feeding station and conveyed to the combined bristle processing and bristle refilling device shown in FIG. 9, while a fresh bristle container is moved to the tuft feeding station.

The device shown in FIG. 9 comprises a step-wise rotating disk 80 which has a number of circumferentially spaced bristle accommodation pockets 82 in its peripheral surface. A raw fibre supply station 84 is provided at a first position around the disk 80 to supply a bundle of raw fibres to each of the pockets 82 passing in front of the fibre supply. By step-wise rotation of the disk 80, bundles of fibres contained in the pockets 82 are indexed to a number of processing stations 86 where the free ends of the fibres are subjected to a grinding operation to rounden the fibre ends. The processing stations 86 are followed by one or more processing stations 88 which are fibre end polishing stations. Finally, bundles with finished bristle fibres are delivered to a collecting station 90 where a bristle container 51 is refilled from its upper, open side, the pressure block 58 (FIG. 2) having been removed.

The device of FIG. 9 has a capacity far in excess of what is required for a single mold of the type shown in FIG. 1. Thus, a plurality of brush molding stations can be supplied with fresh bristle containers using a single combined bristle processing and bristle container refiller device.

In an alternative embodiment, however, a device similar to that shown in FIG. 9 can be incorporated in a tuft feeder of the machine shown in FIG. 1.

With reference to FIGS. 10a to 10f and 11, a preferred embodiment of the tuft picking device will be described.

Figure 10A:
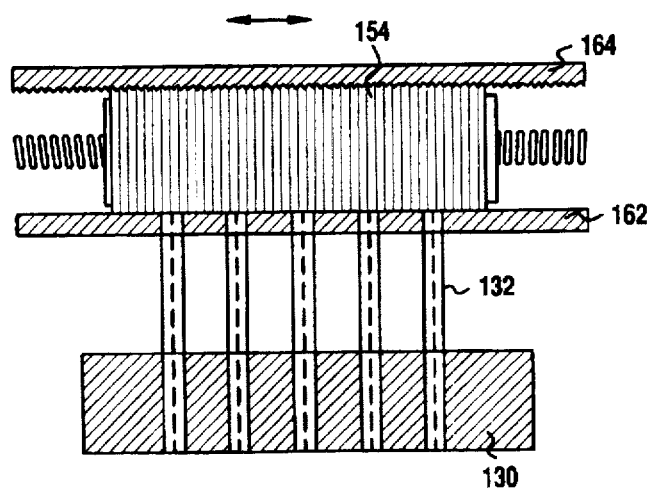
FIGS. 10a to 10f show different phases of picking tube penetration into a bristle container according to another embodiment.

In FIG. 10a, which generally corresponds to FIG. 3a discussed above, the tuft picking tubes 132 are fixed in the carrier 130. Plate 162 is slidably held on the carrier 130 so that plate 162, which has through holes for the picking tubes 132, can slide on these tubes in a manner apparent from the drawings. In the condition shown in FIG. 10a, plate 162 abuts the front ends of the bristles 154 contained in the bristle container 151 (shown in FIG. 11). As before, the rear ends of the bristles 154 are engaged by vibrating plate 164. The picking tubes 132 have their front edges aligned in the plane of plate 162.

Figure 10B:
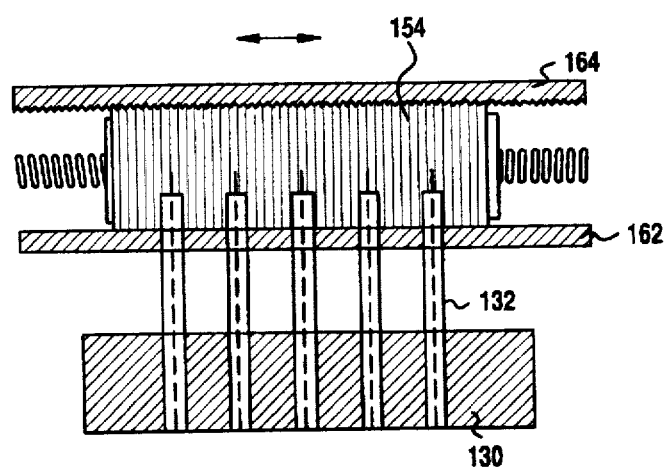

As seen in FIG. 10b, carrier 130 with the picking tubes 132 is now advanced so that the front ends of the picking tubes 132 penetrate into the package of bristles a short distance, which is a small fraction of the bristle length, while plate 164 is continuously vibrating. Plate 162 has retracted from the front edges of the picking tubes 132 by sliding on the tubes. The distance of initial penetration of the picking tubes 132 into the package of bristles 154 depends on the length and thickness of the bristles. For producing tooth brushes, an appropriate distance would be 2 to 3 mm.

The picking tubes 132 remain in this advanced position for a short period of time, 0.5 to 5 seconds, for example, depending on the size and nature of the bristles, while plate 164 continues vibrating. As is easliy understood, in the initial phase of picking tube penetration into the package of bristles, some of the bristles will abut the front edges of the tubes and buckle. However, due to the continued vibration of plate 164, most of the bristles will align inside or outside of the openings in the picking tubes.

Figure 10C:
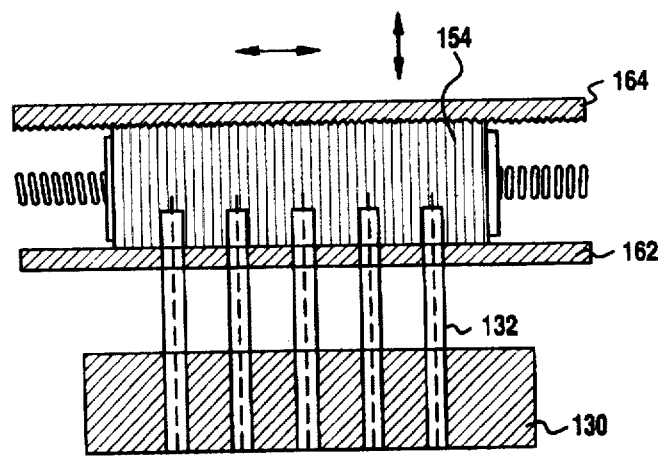

To ensure that all bristles will be properly aligned and no bristles will remain in abutment on the front edges of the picking tubes, plate 164 now performs a combined vibrational and tapping movement, as seen in FIG. 10c. The combined vibrational and tapping movement of plate 164 is performed for a short period of time, several seconds, for example.

Figure 10D:
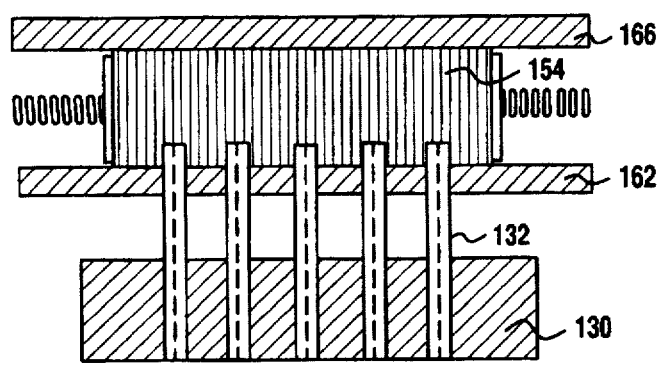

When all bristles are properly aligned inside or outside of the picking tubes, the vibrational and tapping movement of plate 164 is stopped, and this plate is replaced with a reaction plate 166, as seen in FIG. 10d. The reaction plate 166 has a smooth alignment face presented to the rear ends of the bristles 154 in the package.

Figure 10E:
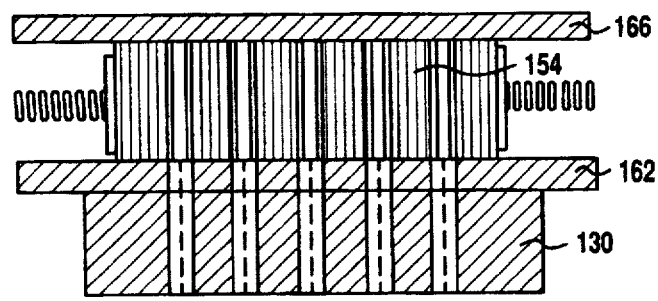

The picking tubes 132 are now further advanced and driven into the package of bristles until their front edges abut plate 166, with a final picking stroke, as shown in FIG. 10e.

Figure 10F:
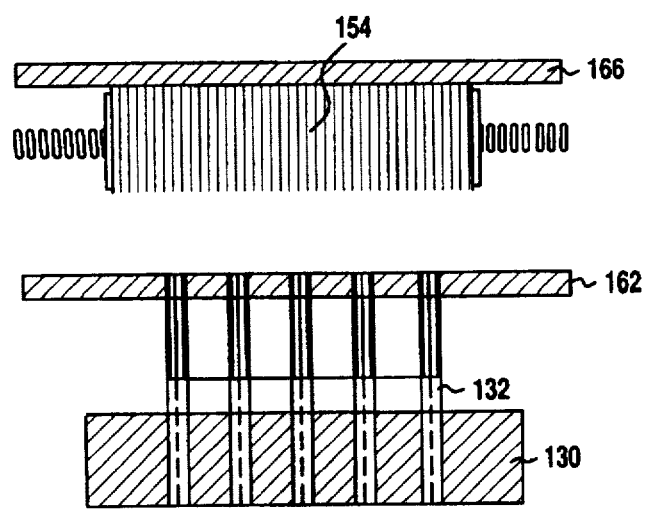

Thereafter, the picking tubes are withdrawn from the package of bristles with tufts of bristles entrained therein, as seen in FIG. 10f. As also seen in this figure, plate 162 moves with carrier 130, leaving the front ends of bristles 154 exposed.

Figure 11:
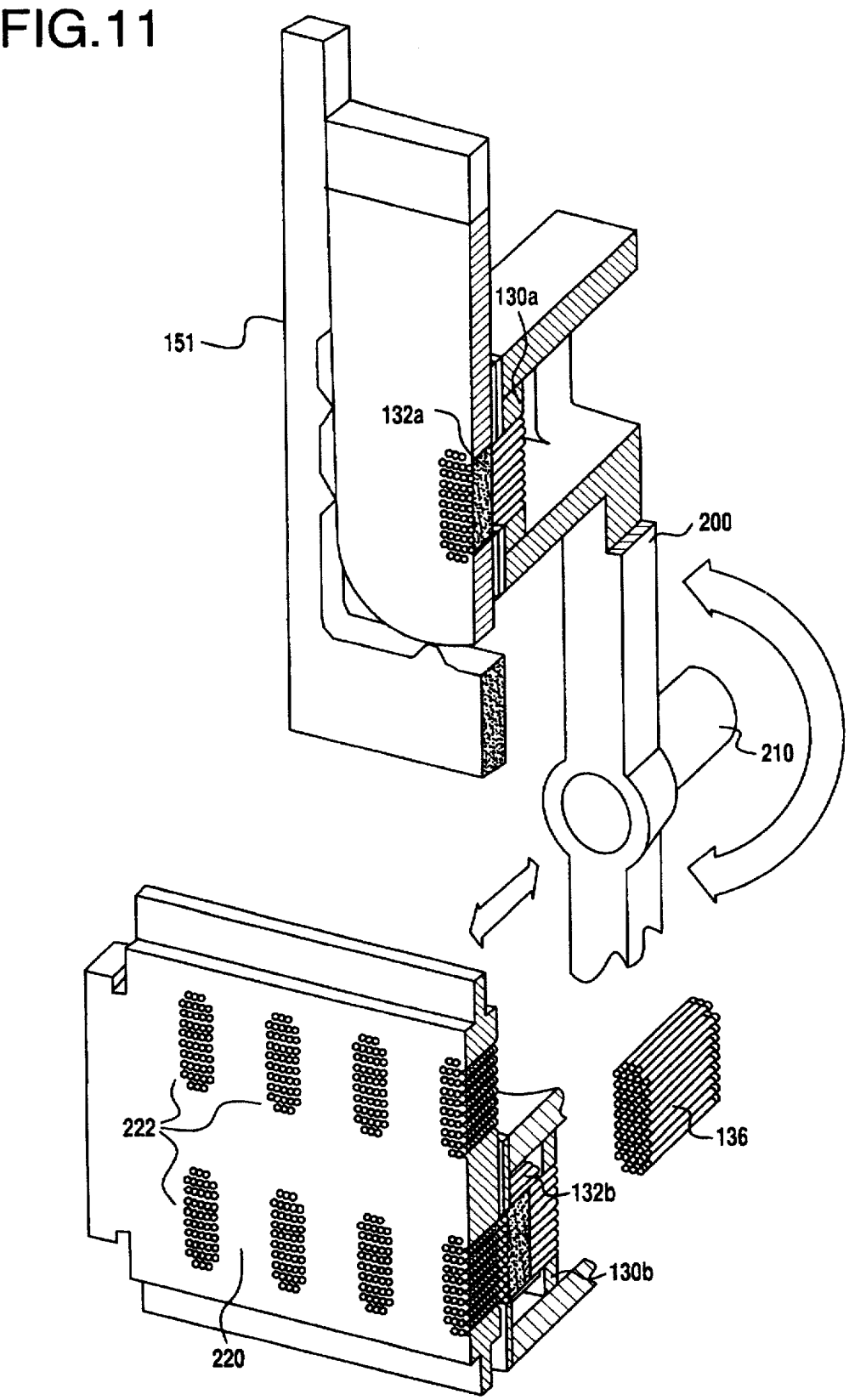
FIG. 11 shows a schematic perspective view of a preferred embodiment of a tuft picking device.

The tuft picking device shown in FIG. 11 operates in the manner described above. In this embodiment of the tuft picking device, a pair of carriers 130a, 130b are movably held in a two-armed carrier holder 200 which is both movable about a horizontal axis 210 and movable along this axis. While carrier 130a is located in front of a bristle container 151 to have its tuft picking tubes filled with tufts of bristles, the other carrier 130b is located in front of a tuft collecting plate 220 which has a plurality of sets of tuft accommodation holes 222 formed therein. More specifically, the front ends of the tuft picking tubes 132b are aligned with one set of tuft accommodation holes 222. To transfer tufts of bristles contained in the picking tubes 132b into the tuft accommodation holes 222 of collecting plate 220, plunger members 136 are introduced into the rear ends of the picking tubes 132b.

In yet another embodiment, the plunger members 136 move along with the picking tubes 132. Thus, relative motion only occurs to move picked bristle tufts into the through holes in tuft collecting plate 220.

When a set of tufts has been transferred from carrier 130b into a set of tuft accommodation holes 222, collecting plate 220 is indexed to present a new set of accommodation holes 222 to the picking tubes 132a of carrier 130a which, when a further set of tufts has been picked out from bristle container 151, is moved in front of collecting plate 220 by a combined rotation and axial movement of the carrier holder 200. Simultaneously, the empty tuft picking tubes 132b of carrier 130b are moved in front of the bristle container 151 to pick out a further set of bristles.

When all sets of tuft accommodation holes 222 in the collecting plate 220 are filled with tufts of bristles, taken from the same bristle container 151 or from different bristle containers, collecting plate 220 is moved to the mold so that the tuft accommodation holes are located in front of corresponding tuft insertion holes of the mold. In this embodiment, of course, the mold has a mold part configured in a manner which corresponds to that of collecting plate 220 for simultaneous molding of a plurality of tooth brushes. The transfer of tufts from collecting plate 220 into the insertion holes of the mold part occurs in a manner similar to the embodiment of FIG. 1, by penetration of plunger members into the rear ends of the tuft accommodation holes 222 so that the tufts will be positively pushed out and into the tuft insertion holes of the mold part.

I claim:

1. A brush making machine comprising a mold for injection molding of brush bodies having tufts of bristles embedded in a molding material, said mold comprising at least two relatively movable mold parts defining a mold cavity, one of said mold parts having a cavity defining surface portion with tuft insertion holes therein arranged in a pattern corresponding to a desired tuft pattern of a brush to be produced, and a tuft feeder being provided for introducing tufts of bristles into said tuft insertion holes so that the bristles project into said cavity, said tuft feeder comprising a bristle container containing pre-finished bristles in a parallel packed relationship and a plurality of tuft picking and transfer tubes arranged in a pattern corresponding to at least part of said pattern of tuft insertion holes, said tuft picking and transfer tubes being movable to pick out tufts of bristles from said bristle container, each of said tuft picking and transfer tubes being associated with a plunger member for penetrating into a respective tuft picking and transfer tube to push out a tuft of bristles contained therein, and said bristles in said bristle container having their ends opposite said tubes frictionally engaged by a plate vibrating in a direction substantially orthogonal to the length of said bristles at least during an initial phase of tube penetration into said bristle container.

2. The brush making machine of claim 1, wherein said tuft picking and transfer tubes are held in a carrier permitting independent axial shifting of said tubes upon penetration into said bristle container and provided with releasable clamping means for clamping said tubes in fixed positions with respect to said carrier during transfer of tufts to said mold, driving means being provided for driving said tubes into said bristle container with a plurality of successive initial strokes whereby each tube is repeatedly advanced so that a front end thereof penetrates into said bristle container only a fraction of bristle length until a tuft of bristles is engaged therein, and with at least one further stroke for advancing said tubes further into said bristle container only when all of said tubes have a tuft of bristles engaged therein.

3. The brush making machine of claim 2, wherein said tubes have rear ends facing away from said bristle container and said driving means comprise a reciprocating pusher member engaging the rear ends of said tubes.

4. The brush making machine according to claim 2, wherein at least two bristle containers are provided with different types of bristles therein and means are provided for selectively advancing said tubes for penetration of at least a first set of tubes into one of said bristle containers and of at least a second set of tubes into another of said bristle containers.

5. The brush making machine according to claim 4, wherein said tubes have rear ends facing away from said bristle container and each of said first and second sets of tubes is associated with a pusher member configured to engage only the rear ends of the tubes in the associated set.

6. The brush making machine of claim 1, wherein tubes are held in a carrier, moving means being provided for moving said carrier in front of said bristle container and advancing said tubes until their front ends penetrate into said bristle container only a fraction of bristle length, and driving means being provided for repeatedly driving said tubes into said bristle container with a plurality of successive initial strokes and with at least one further stroke for advancing said tubes completely into said bristle container after all of said tubes have a tuft of bristles engaged therein.

7. The brush making machine according to claim 2 or claim 6, wherein said bristle container has an open front side and said carrier comprises a cover plate provided with through holes slidingly guiding said tubes, said cover plate being movable into abutment against said open front side.

8. The brush making machine according to claim 2 or claim 6, wherein said carrier is movable in front of said one mold part for direct transfer of picked tufts of bristles into said tuft insertion holes.

9. The brush making machine according to claim 2 or claim 6, wherein said carrier is movable in front of a tuft collecting plate which has a plurality of sets of tuft accommodation holes for transferring picked tufts of bristles into one of said sets of tuft accomodation holes, and said tuft collecting plate being movable in front of said one mold part for transfer of tufts of bristles from said tuft accommodation holes into said tuft insertion holes.

10. The brush making machine according to claim 1, wherein said pattern of tuft insertion holes comprises holes of different size.

11. The brush making machine of claim 1, wherein at least two of said tuft insertion holes merge in a common tuft outlet.

12. The brush making machine according to claim 1, wherein said bristle container includes a flexible band engaged around a pack of bristles.

13. The brush making machine of claim 12, wherein said flexible band forms a generally U-shaped loop into the open side of which a movable pressure member is engaged to maintain said bristles under an at least substantially constant pressure.

14. The brush making machine according to claim 1, wherein a combined bristle processing and bristle container refilling device is provided which includes a rotary indexing disk having a plurality of spaced bristle accommodation pockets along its periphery, a raw fibre supply station at a first position around said disk to supply a bundle of raw fibres to each of said pockets, at least one fibre processing station at a second position peripherally spaced from said first position, and a finished bristle collecting station at a third position peripherally spaced from said first and second positions, said collecting station taking over finished bristles from said pockets and feeding them into an open side of said bristle container.

15. The brush making machine according to claim 1, wherein an inspection device is provided to ensure that each of said tuft insertion holes is filled with a tuft of bristles before a molding operation is initiated.

16. The brush making machine of claim 1, wherein said pattern of tuft insertion holes comprises holes of different shape.

* * * * *